(12) United States Patent
Richter (10) Patent No.: US 10,785,956 B1
(45) Date of Patent: Sep. 29, 2020

(54) NURSING DEVICE

(71) Applicant: Barbara Richter, Bridgeton, NJ (US)

(72) Inventor: Barbara Richter, Bridgeton, NJ (US)

( * ) Notice: Subject to any disclaimer, the term of this patent is extended or adjusted under 35 U.S.C. 154(b) by 245 days.

(21) Appl. No.: 15/919,284

(22) Filed: Mar. 13, 2018

(51) Int. Cl.
*A01K 9/00* (2006.01)
*A61J 11/00* (2006.01)

(52) U.S. Cl.
CPC ............ *A01K 9/005* (2013.01); *A61J 11/005* (2013.01); *A61J 11/0055* (2013.01)

(58) Field of Classification Search
None
See application file for complete search history.

(56) References Cited

U.S. PATENT DOCUMENTS

| | | | |
|---|---|---|---|
| 729,688 A * | 6/1903 | Smith et al. | A01K 9/00 119/71 |
| 886,485 A * | 5/1908 | Espy | A01K 9/00 119/71 |
| 3,122,130 A | 2/1964 | Brown | |
| 4,816,000 A * | 3/1989 | Hsu | A63H 3/005 206/457 |
| 4,979,923 A * | 12/1990 | Tanaka | A61F 7/007 219/201 |
| 5,067,443 A * | 11/1991 | Hurnik | A01K 9/00 119/51.11 |
| 5,188,061 A | 2/1993 | Lombardi | |
| 5,436,429 A * | 7/1995 | Cline | A47J 36/2433 219/202 |
| 5,463,981 A | 11/1995 | Marcinko | |
| D392,776 S * | 3/1998 | Trossevin | A01K 1/0353 D30/121 |
| D394,334 S | 5/1998 | Dorn | |
| 5,784,995 A * | 7/1998 | Willinger | A01K 1/0353 119/28.5 |
| 5,816,193 A | 10/1998 | Haggerty | |
| 6,189,487 B1 * | 2/2001 | Owen | A01K 1/0157 119/28.5 |
| 6,325,695 B1 * | 12/2001 | Weiner | A61F 7/007 446/295 |
| D466,653 S * | 12/2002 | East | A01K 9/00 D30/121 |
| 6,752,103 B1 | 6/2004 | Howell | |
| 6,824,112 B2 * | 11/2004 | Lange | A61J 9/0607 248/102 |

(Continued)

FOREIGN PATENT DOCUMENTS

GB 428403 A * 5/1935 ............ A01K 9/00
GB 2307839 9/1999

*Primary Examiner* — Peter M Poon
*Assistant Examiner* — Morgan T Barlow (57) ABSTRACT

The nursing device is for use with livestock. The nursing device is for use with one or more living cats. The nursing device is for use with a liquid feeding formula (hereinafter formula) for use with livestock. The nursing device is specifically for use with a formula for use with a living cat. The nursing device includes a feline shell, a fluid handling system, and an electrical system. The feline shell is a puppet that resembles a cat. The feline shell contains the fluid handling system and the electrical system. The fluid handling system: 1) contains the formula; and, 2) distributes the formula to the one or more living cats. The electrical system: 1) heats the formula; and, 2) creates audible sounds intended to soothe the one or more living cats.

13 Claims, 7 Drawing Sheets

(56) References Cited

U.S. PATENT DOCUMENTS

| | | |
|---|---|---|
| 6,968,806 B2 | 11/2005 | Helwig |
| 8,186,303 B1* | 5/2012 | Willis ................... A01K 9/00 119/71 |
| 2002/0095103 A1* | 7/2002 | Blue ..................... A61H 1/00 601/46 |
| 2007/0012254 A1* | 1/2007 | Clark .................... A01K 9/00 119/71 |
| 2009/0205574 A1 | 8/2009 | Ross |
| 2010/0083907 A1 | 4/2010 | Polk |
| 2012/0255496 A1* | 10/2012 | Federico ............... A01K 9/00 119/72 |
| 2014/0261204 A1* | 9/2014 | Cruz .................... A01K 9/005 119/71 |
| 2017/0295752 A1* | 10/2017 | Evans ................... A61J 9/005 |

* cited by examiner

NURSING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including animal husbandry, more specifically, a sucking apparatus for young stock that further comprises a plurality of nipples.

SUMMARY OF INVENTION

The nursing device is adapted for use with livestock. The nursing device is specifically adapted for use with one or more living cats. The nursing device is configured for use with a liquid feeding formula (hereinafter formula) configured for use with livestock. The nursing device is specifically adapted for use with a formula adapted for use with a living cat. The nursing device comprises a feline shell, a fluid handling system, and an electrical system. The feline shell is a puppet that resembles a cat. The feline shell contains the fluid handling system and the electrical system. The fluid handling system: 1) contains the formula; and, 2) distributes the formula to the one or more living cats. The electrical system: 1) heats the formula; and, 2) creates audible sounds intended to soothe the one or more living cats.

These together with additional objects, features and advantages of the nursing device will be readily apparent to those of ordinary skill in the art upon reading the following detailed description of the presently preferred, but nonetheless illustrative, embodiments when taken in conjunction with the accompanying drawings.

In this respect, before explaining the current embodiments of the nursing device in detail, it is to be understood that the nursing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the nursing device.

It is therefore important that the claims be regarded as including such equivalent construction insofar as they do not depart from the spirit and scope of the nursing device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
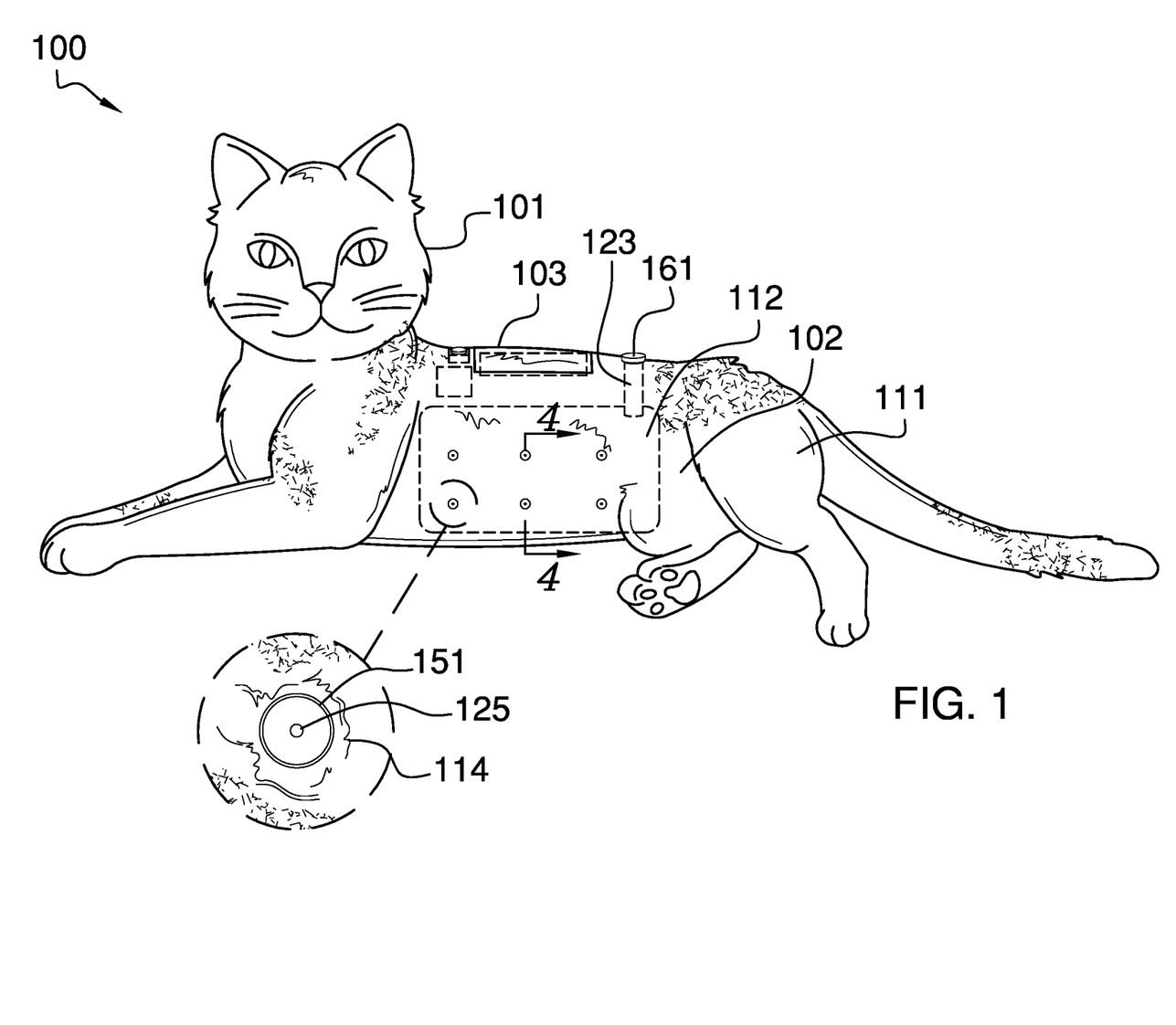
FIG. 1 is a front view of an embodiment of the disclosure.
Figure 2:
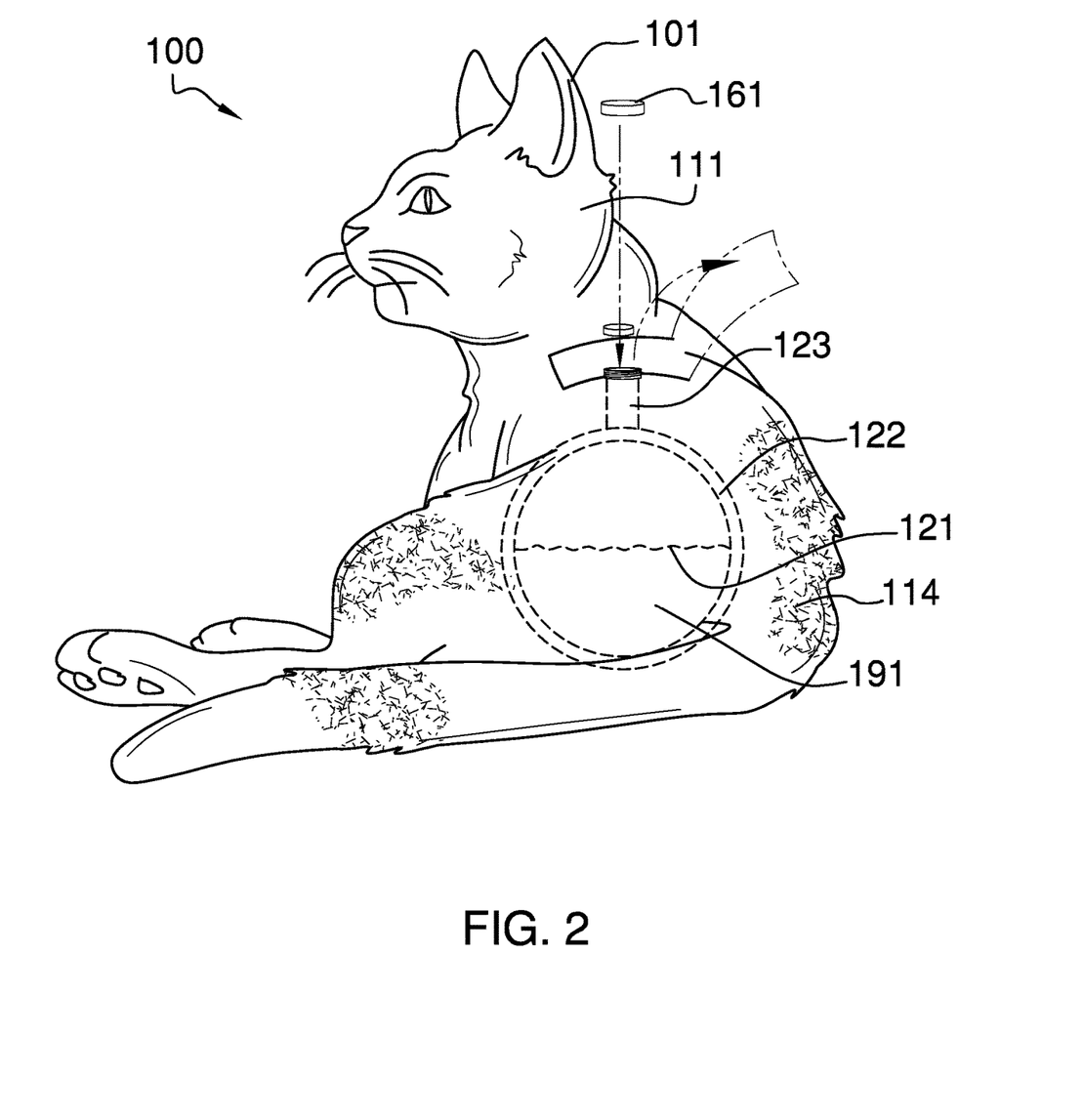
FIG. 2 is a side view of an embodiment of the disclosure.
Figure 3:
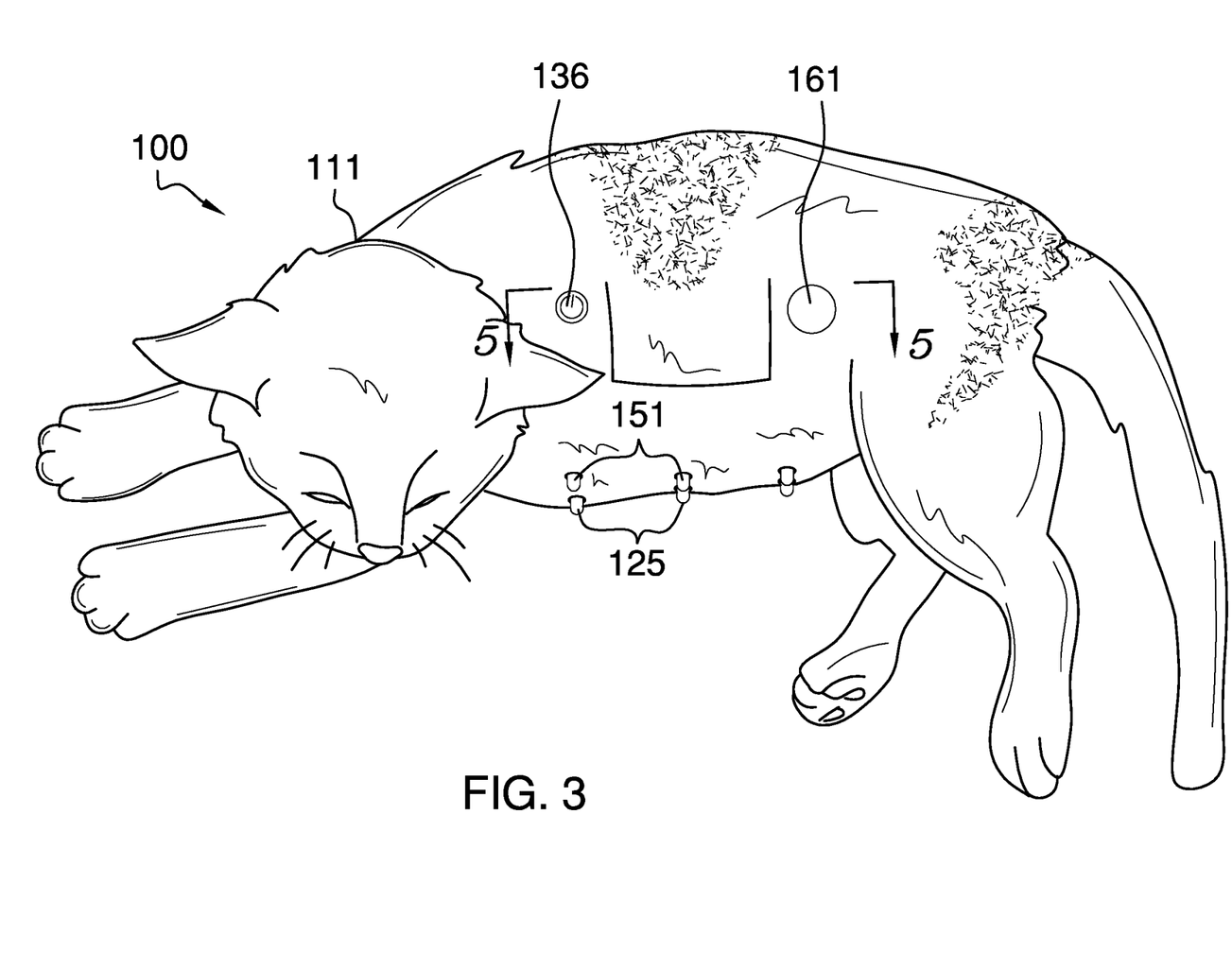
FIG. 3 is a top view of an embodiment of the disclosure.
Figure 4:
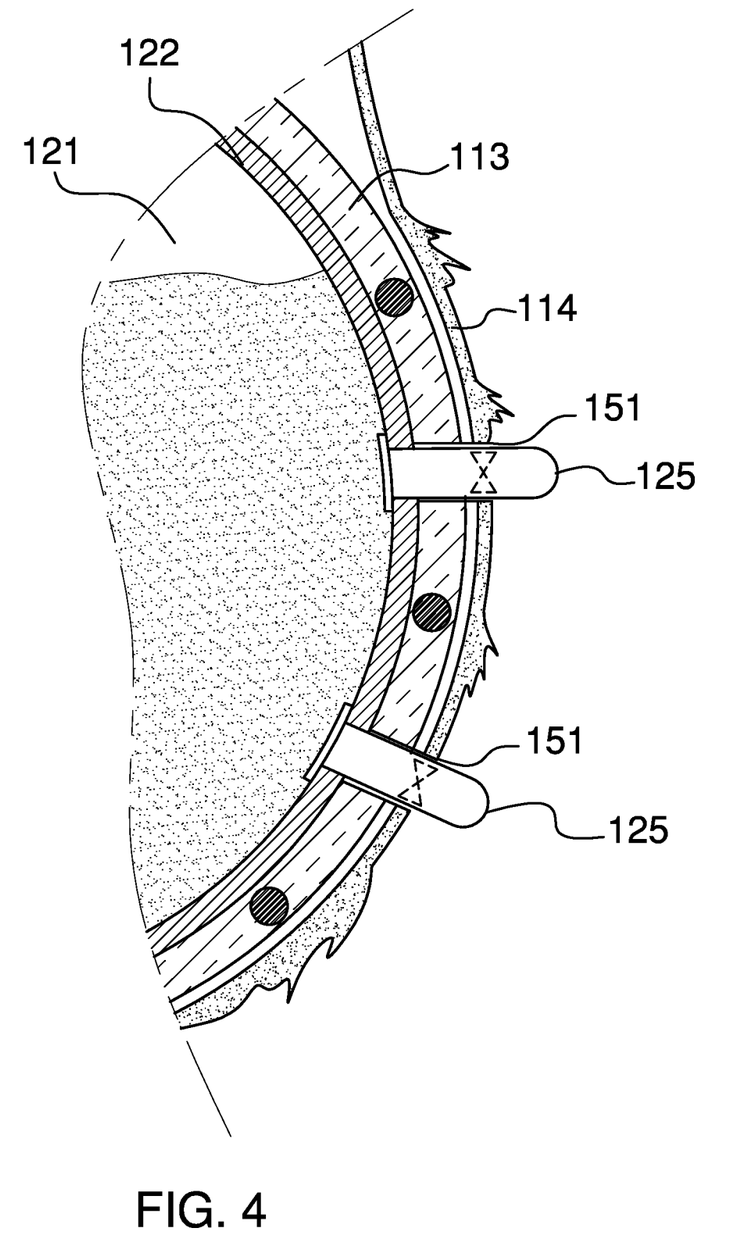
FIG. 4 is a cross-sectional view of an embodiment of the disclosure across 4-4 as shown in FIG. 3.
Figure 5:
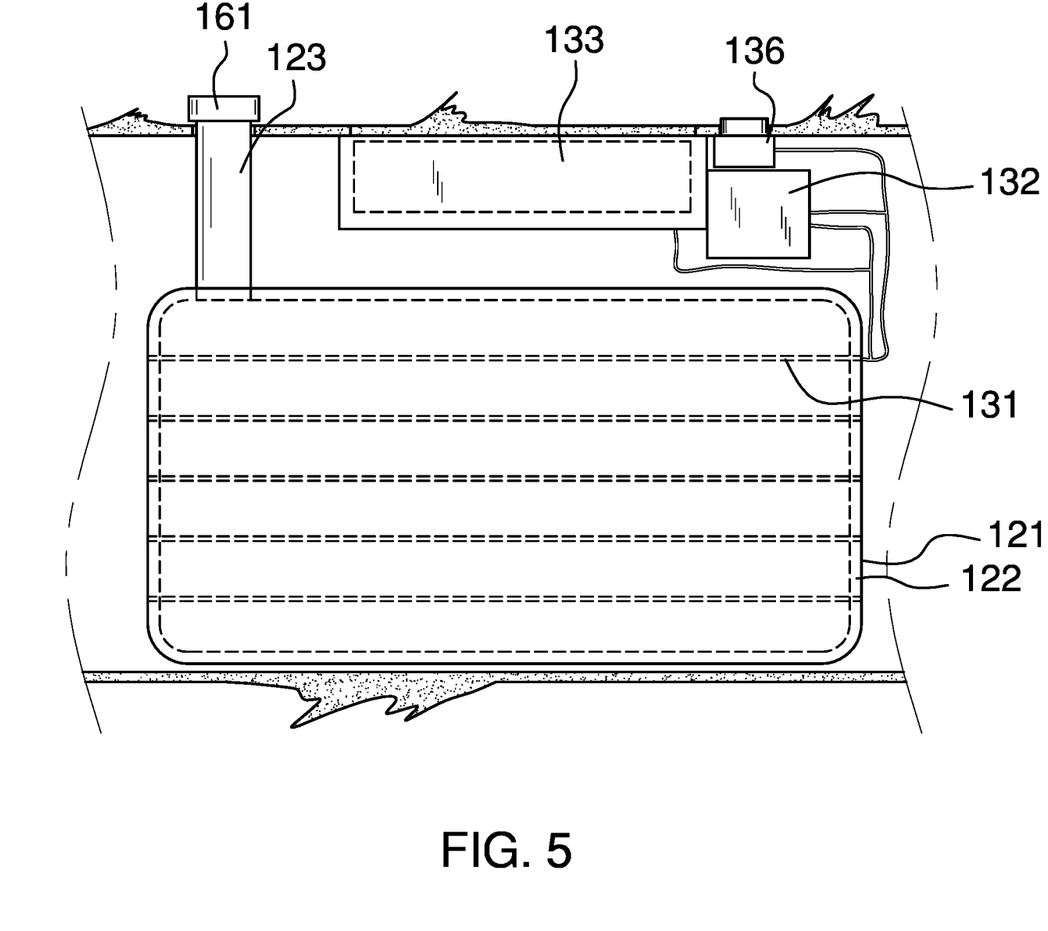
FIG. 5 is a cross-sectional view of an embodiment of the disclosure across 4-4 as shown in FIG. 3.
Figure 6:
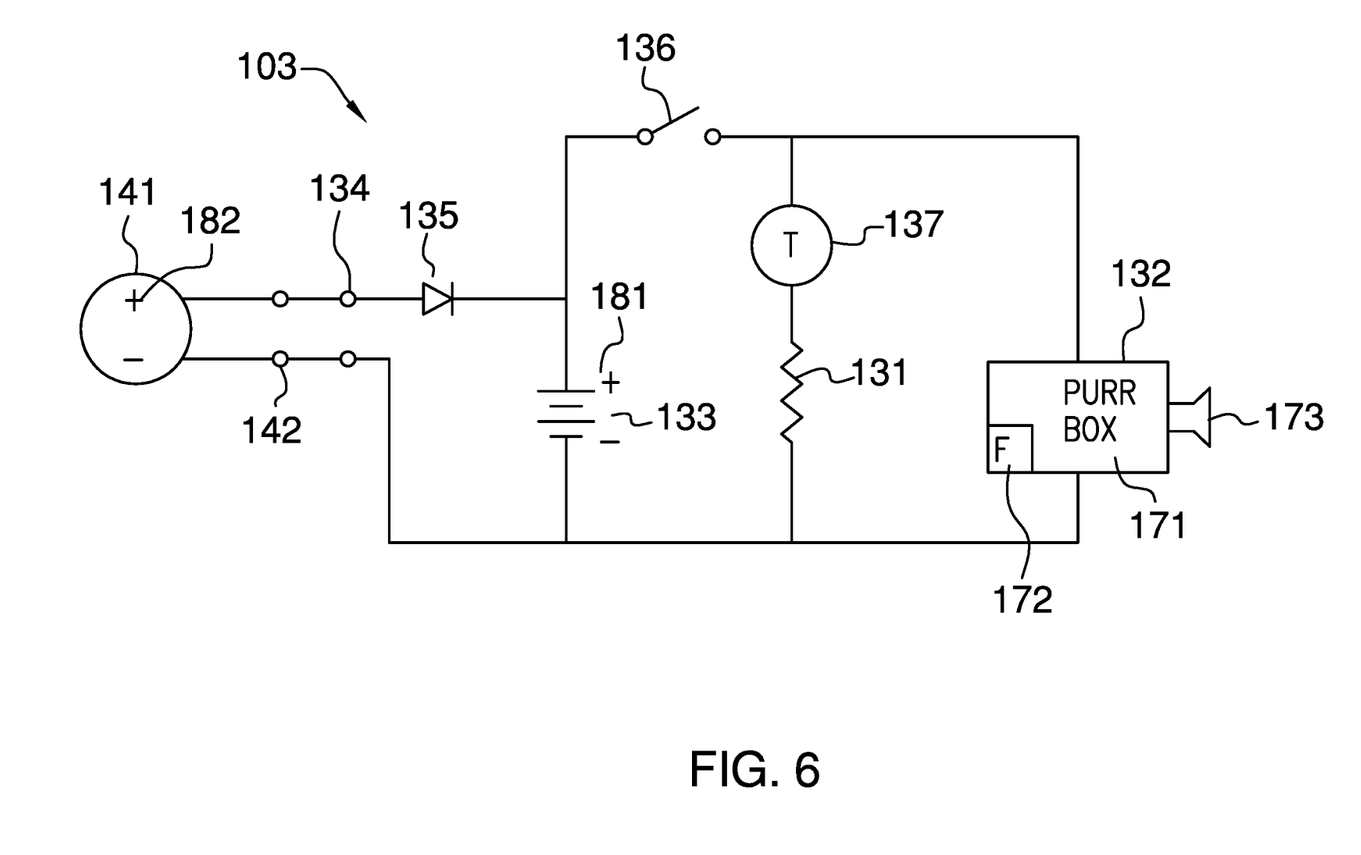
FIG. 6 is a schematic view of an embodiment of the disclosure.
Figure 7:
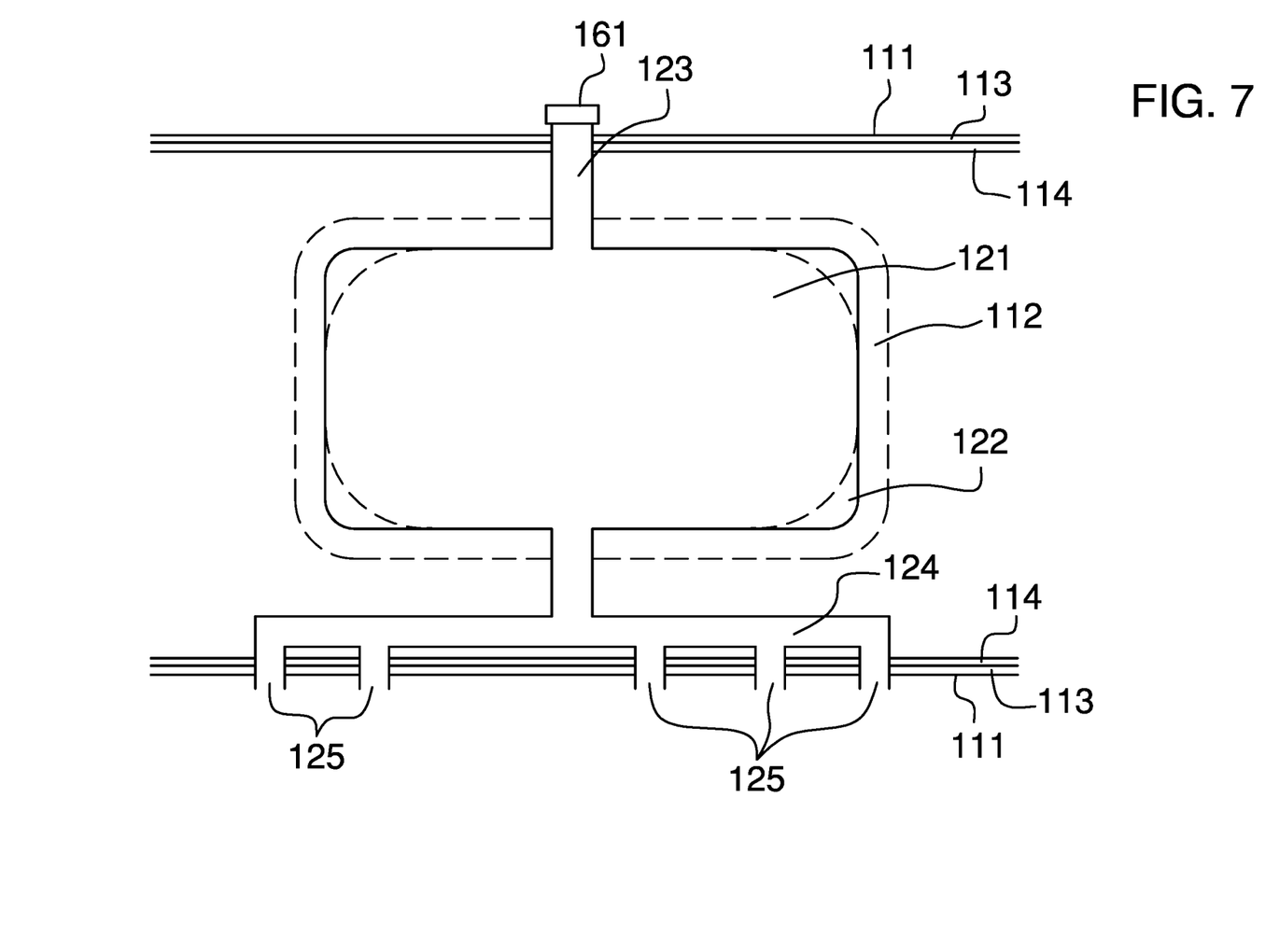
FIG. 7 is a detail view of an embodiment of the disclosure.

Detailed reference will now be made to one or more potential embodiments of the disclosure, which are illustrated in FIGS. 1 through 7.

The nursing device 100 (hereinafter invention) is adapted for use with livestock. The invention 100 is specifically adapted for use with one or more living cats. The invention 100 is configured for use with a liquid feeding formula 191 (hereinafter formula) configured for use with livestock. The invention 100 is specifically adapted for use with a formula 191 adapted for use with a living cat. The invention 100 comprises a feline shell 101, a fluid handling system 102, and an electrical system 103. The feline shell 101 is a puppet that resembles a cat. The feline shell 101 contains the fluid handling system 102 and the electrical system 103. The fluid handling system 102: 1) contains the formula 191; and, 2) distributes the formula 191 to the one or more living cats. The electrical system 103: 1) heats the formula 191; and, 2) creates audible sounds intended to soothe the one or more living cats.

The feline shell 101 is a puppet that forms the exterior surfaces of the invention 100. The feline shell 101 is formed to resemble a live animal that calms the animals nursing at the invention 100. In the first potential embodiment of the disclosure, the feline shell 101 resembles a cat. The feline shell 101 contains the fluid handling system 102 and the electrical system 103. The feline shell 101 comprises an irregular shell 111, a system chamber 112, a first insulating layer 113, and a thermal layer 114.

The irregular shell 111 is a casing. The irregular shell 111 contains the fluid handling system 102 and the electrical system 103. The irregular shell 111 is a three-dimensional structure selected from the group consisting of a semi-rigid structure and a rigid structure. The irregular shell 111 has an irregular shape. The irregular shell 111 has a shape that resembles the shape of an animal. The irregular shell 111 is formed with all apertures and form factors necessary to allow the irregular shell 111 to accommodate the use and operation of the invention 100. In the first potential embodiment of the disclosure, the irregular shell 111 has a shape that resembles the shape of a cat.

The irregular shell 111 further comprises a plurality of apertures 151. The plurality of apertures 151 are discussed in greater detail elsewhere in this disclosure.

The system chamber 112 is a hollow chamber formed within the irregular shell 111. The volume of the system chamber 112 is sized to receive and contain the fluid handling system 102 and the electrical system 103.

The first insulating layer 113 is a first insulating structure formed as a coating around the irregular shell 111. The first insulating layer 113 is formed from an elastomeric material such that the exterior surfaces of the feline shell 101 are soft to the touch. The first insulating layer 113 inhibits heat transfer between the interior and the exterior of the irregular shell 111 such that the formula 191 remains longer at temperature.

The thermal layer 114 is a covering placed over the first insulating layer 113. The thermal layer 114 is a textile material that forms a second insulating structure. The thermal layer 114 is formed in the manner of a textile type selected from the group consisting of a blanket or a fleece. The thermal layer 114 emulates the feel and warmth of the fur of a cat.

The fluid handling system 102: 1) receives and stores the formula 191; and, 2) distributes the formula 191 to one or more living cats. The flow of formula 191 through the fluid handling system 102 is gravity driven. The fluid handling system 102 comprises a formula 191 container 121, a second insulating layer 122, a formula 191 port 123, and a manifold 124, and a plurality of nipples 125. The formula 191 port 123 further comprises a formula plug 161.

The formula 191 container 121 is a fluid impermeable structure used to store the formula 191. When viewed from the center of the formula 191 container 121, the interior surfaces of the formula 191 container 121 are convex surfaces. The convex surfaces ensure that the formula 191 will not accumulate on planar surfaces during use of the invention 100.

The second insulating layer 122 is a third insulating structure formed as a coating around the formula 191 container 121. The second insulating layer 122 inhibits heat transfer between the interior and the exterior of the formula 191 container 121 such that the formula 191 remains longer at temperature.

The formula 191 port 123 is a tubular structure that receives formula 191 from the exterior of the irregular shell 111 and transports the formula 191 into the interior of the formula 191 container 121. In the first potential embodiment of the disclosure, the formula 191 port 123 is formed as a rigid structure. The formula plug 161 is a lid that is used to close formula 191 port 123 when formula 191 port 123 is not in use.

The manifold 124 is a structure that forms a fluidic connection between the formula 191 container 121 and the plurality of nipples 125. Each of the plurality of nipples 125 is a device that delivers the formula 191 to a cat selected from the one or more living cats. Each of the plurality of nipples 125 are identical. Each of the plurality of nipples 125 are commercially available. Each of the plurality of apertures 151 is an aperture formed through the irregular shell 111. Each nipple selected from the plurality of nipples 125 inserts through an aperture selected from the plurality of apertures 151 such that the one or more cats can feed on the plurality of nipples 125. The use of a nipple in feeding livestock is well-known in animal husbandry.

The electrical system 103 is an electrically powered device. The electrical system 103 heats the formula 191 within the fluid handling system 102. The electrical system 103 further generates audible sounds that emulate the sounds of livestock. In the first potential embodiment of the disclosure, the audible sounds generated by the electrical system 103 emulate the sounds of a cat. The electrical system 103 comprises a heating element 131, a purr box 132, a battery 133, a charging port 134, a diode 135, a switch 136, and a thermostat 137. The electrical system 103 is configured to work with an external power source 141. The external power source 141 further comprises a charging plug 142. The battery 133 is further defined with a first positive terminal 181. The external power source 141 is further defined with a second positive terminal 182.

The heating element 131 is a resistive wire. The heating element 131 generates heat when an electric current passes through the heating element 131. The heating element 131 wraps around the exterior surface of the formula 191 container 121 such that the heating element 131 will heat the formula 191 within the formula 191 container 121. The heating element 131 is located between the second insulating layer 122 and the formula 191 container 121 such that the second insulating layer will not impede heat transfer between the heating element 131 and the formula 191 container 121. The battery 133 powers the heating element 131.

The purr box 132 is an electrical device. The purr box 132 generates the audible sound that is used to calm the one or more living cats. The battery 133 powers the purr box 132. In the first potential embodiment of the disclosure, the heating element 131 and the purr box 132 are wired in parallel. The purr box 132 further comprises an audio source 171, an audio file 172, and a speaker 173.

The audio source 171 is an electrical device. The audio source 171 translates digital information stored in the audio file 172 into electrical signals that are transmitted to the speaker 173. The audio file 172 is a digital representation of acoustic energy that is presented in a format that can be read by the audio source 171. The audio file 172 encodes the sounds used by an animal to calm their young. In the first potential embodiment of the disclosure, the audio file 172 encodes the calming sounds made by a cat. Methods to create an audio file 172 are well-known and documented in the electrical arts. The speaker 173 is a commercially available transducer that converts electrical energy into audible sounds.

The battery 133 is a commercially available rechargeable battery 133. The chemical energy stored within the rechargeable battery 133 is renewed and restored through the use of the charging port 134. The charging port 134 is an electrical circuit that reverses the polarity of the rechargeable battery 133 and provides the energy necessary to reverse the chemical processes that the rechargeable battery 133 initially used to generate the electrical energy. This reversal of the chemical process creates a chemical potential energy that will later be used by the rechargeable battery 133 to generate electricity.

The charging port 134 attaches to an external power source 141 using a charging plug 142. The charging port 134 receives electrical energy from the external power source 141 through the charging plug 142. The diode 135 is an electrical device that allows current to flow in only one direction. The diode 135 installs between the rechargeable battery 133 and the charging port 134 such that electricity will not flow from the first positive terminal 181 of the rechargeable battery 133 into the second positive terminal 182 of the external power source 141.

The switch 136 is a maintained switch 136. The switch 136 functions as the power switch of the invention 100. The switch 136 controls the flow of electricity from the battery 133 to both the heating element 131 and the purr box 132.

The thermostat 137 is an electrical switch that is actuated by a measured temperature. The temperature sensor of the thermostat 137 is positioned in the interior of the formula 191 container 121 such that the temperature within the formula 191 container 121 controls the operation of the thermostat 137. As shown most clearly in FIG. 6, the thermostat 137 is wired in series with the heating element 131 such that the thermostat 137 controls the flow of electricity through the heating element 131 but not the purr box 132. By turning on and off the heating element 131, the thermostat 137 controls the temperature of the formula 191 within the formula 191 container 121. The thermostat 137 is commercially available. The use of a thermostat 137 for the purposes described in this paragraph are well-known and documented in the mechanical and electrical arts.

The following definitions were used in this disclosure:

Audio File: As used in this disclosure, an audio file is a digital representation of a sound that is used to store a recording of the sound. Separate hardware is used to convert the digital representation of the sound into an audible sound.

Audio Source: As used in this disclosure, an audio source is a device that generates electrical signals that can be converted into audible sounds by a speaker.

Battery: As used in this disclosure, a battery is a chemical device consisting of one or more cells, in which chemical energy is converted into electricity and used as a source of power.

Coating: As used in this disclosure, a coating refers to a substance that is applied to the exterior surface of an object such that the coating forms a new exterior surface of the object. A coating is commonly said to be formed as a layer. Paint is an example of a common coating material.

Chamber: As used in this disclosure, a chamber is an enclosed or enclosable space that is dedicated to a purpose.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Diode: As used in this disclosure, a diode is a two terminal semiconductor device that allows current flow in only one direction. The two terminals are called the anode and the cathode. Electric current is allowed to pass from the anode to the cathode.

Elastic: As used in this disclosure, an elastic is a material or object that deforms when a force is applied to it and that is able to return to its relaxed shape after the force is removed. A material that exhibits these qualities is also referred to as an elastomeric material.

Electrical Plug: As used in this disclosure, an electrical plug is an electrical termination that electrically connects a first electrical circuit to a second electrical circuit or a source of electricity. As used in this disclosure, an electrical plug will have two or three metal pins.

Electrical Port: As used in this disclosure, an electrical port is an electrical termination that is used to connect a first electrical circuit to a second external electrical circuit. In this disclosure, the electrical port is designed to receive an electrical plug.

External Power Source: As used in this disclosure, an external power source is a source of the energy that is externally provided to enable the operation of the present disclosure. Examples of external power sources include, but are not limited to, electrical power sources and compressed air sources.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use fluidic connection are well-known and documented in the mechanical, chemical, and plumbing arts.

Fluid Plug: As used in this disclosure, a fluid plug is an object that blocks flow into and out of a cavity or an aperture.

Fluid Port: As used in this disclosure, a fluid port is an opening formed in an object that allows fluid to flow through the boundary of the object.

Form Factor: As used in this disclosure, the term form factor refers to the size and shape of an object.

Heating Element: As used in this disclosure, a heating element is a resistive wire that is used to convert electrical energy into heat. Common metal combinations used to form heat elements include a combination of nickel and Chromium (typical: 80/20), a combination of iron, chromium, and aluminum (typical 70/25/5), a combination of copper, nickel, iron, and manganese (typical 66/30/2/2) (use for continuously hot), or platinum.

Housing: As used in this disclosure, a housing is a rigid casing that encloses and protects one or more devices.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Lid: As used in this disclosure, a lid is a removable cover that is placed over an opening of a hollow structure to enclose the hollow structure.

Maintained Switch: A used in this disclosure, a maintained switch is a switch that maintains the position that was set in the most recent switch actuation. A maintained switch works in an opposite manner to a momentary switch.

Manifold: As used in this disclosure, a manifold is a pipe or chamber having several ports through which liquid or gas is gathered or distributed.

Nipple: As used in this disclosure, a nipple is a structure that: 1) terminates a channel formed within a fluidic network; and, 2) dispenses a fluid from the fluidic channel.

Puppet: As used in this disclosure, a puppet is a FIG. resembling a human, animal or symbolic image that can be moved and that is used for entertainment or educational purposes. A hand puppet refers to a puppet wherein a hand inserts into the hand puppet such that movements of the hand with the hand puppet will cause the hand puppet to move. Hand puppets are commonly available. Hand puppets are often made from textile materials.

Rigid Structure: As used in this disclosure, a rigid structure is a solid structure formed from an inelastic material that resists changes in shape. A rigid structure will permanently deform as it fails under a force.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Shell: As used in this disclosure, a shell is a structure that forms an outer covering intended to contain an object. Shells are often, but not necessarily, rigid or semi-rigid structures that are intended to protect the object contained within it.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Thermostat: As used in this disclosure, a thermostat is a device that monitors the temperature of a space such that the thermostat 1) operates a switch when the measured temperature exceeds or falls below a first preset temperature; and, 2) performs the opposite operation on the switch when the measured temperature falls below or exceeds a second preset temperature.

Tube: As used in this disclosure, a tube is a hollow prism-shaped device used for transporting liquids and gases. In this disclosure, the terms inner dimensions of a tube and outer dimensions of a tube are used as they would be used by those skilled in the plumbing arts.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A nursing device comprising:
a feline shell, a fluid handling system, and an electrical system;
wherein the feline shell comprises an irregular shell, a system chamber, a first insulating layer, and a thermal layer;
wherein the feline shell contains the fluid handling system and the electrical system;
wherein the nursing device is configured for use with a formula;
wherein the feline shell is a puppet that resembles a cat;
wherein the fluid handling system contains the formula;
wherein the fluid handling system distributes the formula;
wherein the electrical system is an electrically powered device;
wherein the electrical system heats the formula;
wherein the electrical system creates audible sounds;
wherein the irregular shell contains the system chamber;
wherein the first insulating layer covers the exterior of the irregular shell;
wherein the thermal layer covers the first insulating layer;
wherein the system chamber is a hollow chamber formed within the irregular shell;
wherein the irregular shell contains the fluid handling system and the electrical system;
wherein the irregular shell further comprises a plurality of apertures;
wherein the plurality of apertures are formed through the irregular shell, the first insulating layer, and the thermal layer;
wherein the volume of the system chamber is sized to receive and contain the fluid handling system and the electrical system;
wherein the first insulating layer is formed from an elastomeric material;
wherein the fluid handling system comprises a formula container, a second insulating layer, a formula port, and a manifold, and a plurality of nipples;
wherein the second insulating layer and the formula port attach to the formula container;
wherein the manifold attaches the formula container to the plurality of nipples.

2. The nursing device according to claim 1 wherein the flow of formula through the fluid handling system is gravity driven.

3. The nursing device according to claim 2
wherein the formula container is a fluid impermeable structure;
wherein the formula container stores the formula;
wherein the second insulating layer is an insulating structure;
wherein the second insulating layer forms a coating around the formula container.

4. The nursing device according to claim 3
wherein the formula port is a tubular structure;
wherein the formula port extends from the exterior of the irregular shell and transports the formula into the interior of the formula container;
wherein the formula port further comprises a formula plug;
wherein the formula plug is a lid.

5. The nursing device according to claim 4
wherein the manifold forms a fluidic connection between the formula container and the plurality of nipples;
wherein each of the plurality of nipples delivers the formula to the exterior of the feline shell.

6. The nursing device according to claim 5 wherein each of the plurality of nipples are identical.

7. The nursing device according to claim 6
wherein the electrical system comprises a heating element, a purr box, a battery, a charging port, a diode, a switch, and a thermostat;
wherein the heating element, the purr box, the battery, the charging port, the diode, the switch, and the thermostat are electrically interconnected;
wherein the electrical system is configured to work with an external power source;
wherein the external power source further comprises a charging plug;
wherein the battery is further defined with a first positive terminal;
wherein the external power source is further defined with a second positive terminal.

8. The nursing device according to claim 7
wherein the heating element is a resistive wire;
wherein the heating element wraps around the exterior surface of the formula container such that the heating element will heat the formula within the formula container;
wherein the battery powers the heating element.

9. The nursing device according to claim 8
wherein the purr box is an electrical device;
wherein the purr box generates the audible sound;
wherein the battery powers the purr box;
wherein the purr box further comprises an audio source, an audio file, and a speaker;
wherein the audio source is an electrical device;
wherein the audio source translates digital information stored in the audio file into electrical signals that are transmitted to the speaker;
wherein the audio file is a digital representation of acoustic energy;
wherein the speaker is a transducer that converts electrical energy into audible sounds.

10. The nursing device according to claim 9
wherein the battery is a rechargeable battery;
wherein the charging port is an electrical circuit that reverses the polarity of the rechargeable battery;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

11. The nursing device according to claim 10
wherein the switch is a maintained switch;
wherein the switch controls the flow of electricity from the battery to both the heating element and the purr box;
wherein the thermostat is an electrical switch that is actuated by a measured temperature;
wherein the temperature sensor of the thermostat is positioned in the interior of the formula container such that the temperature within the formula container controls the operation of the thermostat;
wherein the thermostat is wired in series with the heating element such that the thermostat controls the flow of electricity through the heating element.

12. The nursing device according to claim 11
wherein the nursing device is specifically adapted for use with one or more living cats;
wherein the fluid handling system delivers the formula to the one or more living cats;
wherein the electrical system creates audible sounds intended to soothe the one or more living cats.

13. The nursing device according to claim 12 wherein the heating element and the purr box are wired in parallel.

* * * * *